United States Patent [19]

Reddy et al.

[11] Patent Number: 5,753,785
[45] Date of Patent: May 19, 1998

[54] PRODUCTION OF E-B COPOLYMERS WITH A SINGLE METALLOCENE CATALYST AND A SINGLE MONOMER

[75] Inventors: Baireddy Raghava Reddy, Baytown; Edwar S. Shamshoum, Houston; Margarito Lopez, Pasadena, all of Tex.

[73] Assignee: Fina Technology, Inc., Dallas, Tex.

[21] Appl. No.: 766,075

[22] Filed: Dec. 16, 1996

[51] Int. Cl.$^6$ .............................. C08F 4/622; C08F 4/623; C08F 210/02

[52] U.S. Cl. .............................. 526/75; 526/133; 526/134; 526/153; 526/160; 526/348.6; 526/943

[58] Field of Search .............................. 526/75, 160

[56] References Cited

U.S. PATENT DOCUMENTS

| | | | |
|---|---|---|---|
| 4,861,846 | 8/1989 | Conn et al. | 526/75 |
| 5,137,994 | 8/1992 | Goode et al. | 526/75 |
| 5,321,107 | 6/1994 | Tsutsui et al. | |
| 5,329,031 | 7/1994 | Miyake et al. | 526/160 |

*Primary Examiner*—Edward J. Smith
*Attorney, Agent, or Firm*—Jimmy D. Wheelington; M. Norwood Cheairs

[57] ABSTRACT

A process of polymerizing ethylene with a catalyst using a single metallocene catalyst comprising a bridged metallocene compound having two cyclopentadienyl rings, one substituted with a bulky group in a distal position and one substituted such that a fused ring, substituted or unsubstituted, is formed, which produces a copolymer of ethylene. The metallocene catalyst promotes simultaneous oligomerization of a fraction of ethylene to form a comonomer in situ and copolymerization of the remaining ethylene and the comonomer to form a copolymer.

38 Claims, No Drawings

PRODUCTION OF E-B COPOLYMERS WITH A SINGLE METALLOCENE CATALYST AND A SINGLE MONOMER

BACKGROUND OF THE INVENTION

1. Field of the Invention

The present invention relates to the production of ethylene/butene copolymer by polymerizing ethylene only without the use of butene comonomer. In another aspect, the present invention also relates to the use of a single metallocene catalyst system in the copolymerization of ethylene and butene to produce ethylene/butene copolymers wherein the butene is produced by in situ dimerization of ethylene.

2. Description of Prior Art

Commercially useful, ethylene-based polymers such as HDPE (High Density PolyEthylene), LLDPE (Linear, Low Density PolyEthylene) are produced by copolymerization of predominantly ethylene with low levels of α-olefins such as 1-butene, 1-hexene and 1-octene. A supported chromium catalyst which in combination with trialkylboron or a polyalkyl silane trimerizes and polymerizes ethylene to produce ethylene/hexene copolymers under slurry conditions was described in U.S. Pat. No. 5,071,627 (issued E. A. Benham; M. P. McDaniel; R. R. McElvain; R. O. Schneider, assigned to Phillips). Another single catalyst system based on chromium and trialkylaluminum for use in gas phase reactors to produce ethylene/hexene polymers was described in U.S. Pat. No. 5,137,994 (issued on Aug. 11, 1992, assigned to Union Carbide). Another single catalyst system, described in WO86/05500 (issued on Sep. 25, 1986), developed for gas phase reactors is based on titanium; utilizes trialkylaluminums as the cocatalysts, and produces ethylene/butene copolymers. A combination of titanium or vanadium based solid catalyst and a conventional Ziegler-Natta catalyst system for the dimerization and polymerization of ethylene to produce ethylene/butene copolymers in a single reactor was described in EP 0,230,983 A1 (issued to M. P. McDaniel; P. D. Smith; D. D. Klendworth, assigned to Phillips). Another European patent application, EPO,307,907 (issued to E. A. Boggs, assigned to Phillips) describes a supported chromium based catalyst system, which oligomerizes ethylene to produce butene, hexene and octene etc., which are further copolymerized with ethylene to produce ethylene polymers the densities of which can be varied by varying the polymerization conditions.

The ethylene/1-olefin copolymers produced by Ziegler-Natta type of catalysts suffer from several disadvantages. For example, the distribution of comonomer has been shown to be inhomogeneous and predominantly concentrated in the low molecular weight fractions of the polymer. In order to ensure sufficient incorporation of comonomer in the high molecular weight fraction, large amounts of comonomer are generally required. Additionally, the randomness of the comonomer distribution in the copolymers produced by Ziegler-Natta based catalysts is not very high. It is now become an established fact that metallocenes in combination with cocatalysts such as alkylalumoxanes or ionic cocatalysts polymerize monomer mixtures such as ethylene/1-olefin and propylene/1-olefin mixture to produce copolymers which do not suffer from the above described disadvantages. Thus, for example, it was shown that metallocene complexes containing bridged cyclopentadienyl type of ligands and Group IV metals incorporate comonomers uniformly in polyethylene backbone as shown in U.S. Pat. No. 5,453,475 and WO 88/04672. Similarly, it was shown that increased randomness of ethylene distribution in polypropylene backbone produced by copolymerizing the monomers with metallocene catalysts improve heat seal properties and decrease the heat seal temperatures relative to the copolymers produced by Ziegler Natta catalysts (EP 0,495,099A1). A comparison of ethylene/butene copolymer obtained by Zeigler-Natta and metallocene catalyst is given by K. Hesland and W. Kaminsky in Makromolecular Chemie [vol. 193, p. 601–660 (1992)], Table 4, p. 608.

It would be advantageous to dimerize ethylene in situ and produce random ethylene/butene copolymers in a single reactor with a single catalyst system with high catalyst efficiencies. Ethylene could be used as the only monomer and allow the metallocene catalyst system to oligomerize, particularly dimerize or trimerize, a fraction of ethylene to form a comonomer and copolymerize ethylene and the comonomer(s) produced in situ. This would amount to using a single catalyst system in a single reactor with only ethylene to produce ethylene/1-olefin copolymers. Such process would offer one of the most economical ways of producing such copolymers with all the desired properties. However, no single metallocene based catalysts are currently known which can oligomerize as well as polymerize ethylene in a single reactor under given process conditions. They are known to either oligomerize or polymerize ethylene under a given set of conditions. A recent publication on this subject appeared in Angew. Makromol. Chem., 227, 159–177 (1995).

SUMMARY OF THE INVENTION

The present invention discloses catalyst systems which oligomerize (dimerize or trimerize) ethylene to generate comonomers in situ which in turn will be utilized in a simultaneous copolymerization process to produce copolymers of ethylene and the comonomer generated from the oligomerization (dimerization or trimerization) of ethylene. Such type of processes would enable use of only a single monomer stream to produce copolymers. This would amount to savings in the comonomer raw material cost and simplification of the production process. In accordance with one aspect of the invention, a catalyst system comprising of a metallocene catalyst and alumoxane cocatalyst, either alone or with an additional aluminumalkylchloride cocatalyst, produces ethylene/butene copolymers by using ethylene as the sole monomer at commercially useful temperatures.

In another aspect of the invention, ethylene/butene copolymers are produced from ethylene alone in a single reactor under slurry polymerization conditions.

In another aspect of the invention, the amount of butene incorporated can be affected by polymerization temperature.

In another aspect of the invention, the amount of butene incorporated can be affected by hydrogen pressure.

In another aspect of the invention, the molecular weight of the polymer can be modified by polymerization temperature and reactor pressure.

The present invention provides a catalyst comprising a bridged metallocene having two cyclopentadienyl rings, one substituted with a bulky group in a distal position and one substituted such that a fused ring is formed. The catalyst may further comprise an ionizing agent or cocatalyst, such as alumoxane or alumoxane in combination with an aluminumalkylchloride, which combines with the metallocene to form an active catalyst. The present invention further provides a process for producing copolymers, particularly ethylene/butene copolymer. The process comprises utilizing at least one of the catalysts described by the above

3 formula and introducing the catalyst into a copolymerization reaction zone containing the olefin monomers. An ionizing agent or cocatalyst, such as alumoxane, may be introduced into the reaction zone with the metallocene and olefin monomers or combined with the metallocene in a separate step. Further, the active catalyst may also be prepolymerized prior to introducing it into the reaction zone and/or prior to the stabilization of reaction conditions in the reactor.

DETAILED DESCRIPTION OF THE INVENTION

The present invention provides a process and catalyst for the simultaneous dimerization of ethylene to butene and polymerization of ethylene and butene to produce an ethylene/butene copolymer. The process includes using a particular type of catalyst in the polymerization of ethylene which results in the production of an ethylene/butene copolymer without the use of a butene comonomer. The catalyst is a metallocene catalyst with the precursor of the catalyst being a neutral metallocene compound of the formula:

$$R''(C_5R_4)(C_5R'_4)MR^*_{v-2}$$

where R" is a bridge imparting stereorigidity to the structure to the metallocene by connecting the two cyclopentadienyl rings, $(C_5R_4)$ is a cyclopentadienyl ring, R and R' are substituents on the cyclopentadienyl rings and can be hydrogen or a hydrocarbyl radical from 1–9 carbon atoms, each R and R' being the same or different, M is a Group IIIB or IVB metal, R* is a hydride, a halogen or a hydrocarbyl from 1–20 carbon atoms, v is the valence of M. $(C_5R_4)$ is a cyclopentadienyl ring having one R substituent in a distal position which is at least as bulky as a t-butyl radical. $(C_5R'_4)$ is an indenyl or fluorenyl ring, substituted or unsubstituted.

In this description of the metallocene compound or catalyst precursor, "distal" means located in a position most distant from the bridgehead carbon as illustrated by positions 3 and 4 (1 being the position of the bridgehead carbon) in the diagram below:

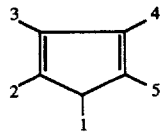

Due to identical chemical environment of the cyclopentadienyl ring, positions 3 and 4 are equivalent, and interchangeable in chemical formula nomenclature. The numerical positions 2 and 5 are also referred to as a positions and the numerical positions 3 and 4 are also referred to as β positions and represent the positions of possible substituents in the proximal and distal position, respectively. The numerical positions of the indenyl ring represent the position of possible substituents on the indenyl ring, 1 being the position of the bridge.

"Bulky" is related to spatial displacement and in this invention means, preferably, having a spatial displacement equal to or greater than a tertiary butyl $[(CH_3)_3C]$ group.

The metallocene compound or catalyst precursor is stereorigid. Stereorigidity is imparted to prevent rotation of the cyclopentadienyl rings about their coordination axes and may be obtained by several ways. Stereorigidity is preferably obtained by means of a structural bridge between the cyclopentadienyl rings which connects them and fixes their location relative to one another. If not accomplished by means of a bridge between the two cyclopentadienyl rings, stereorigidity may be obtained by substituted cyclopentadienyl rings in which the substituent groups provide steric hindrance by nonbonded spatial interaction between the substituted cyclopentadienyl rings or by virtue of the bulk of the substituent groups. Attaining stereorigidity by such methods is disclosed in U.S. Pat. Nos. 5,162,278; 5,223,467 and 5,223,468. Stereorigidity may also be obtained by the cyclopentadienyl rings being in a state of low kinetic energy.

The metallocene is chiral in that its mirror image is not superimposable on the original. The ligand structure of the metallocene does not have bilateral symmetry. An illustration of the ligands of isopropylidene [(3-t-butylcyclopentadienyl) (indenyl)]zirconium dichloride, abbreviated as $Me_2C(t-buCp)(Ind)ZrCl_2$, is shown below:

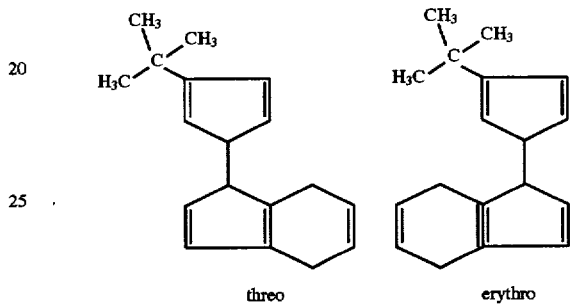

threo         erythro

An examination of the model of this metallocene shows that the t-butyl group may be positioned in close proximity to the phenyl ring of indene, or away from the phenyl group of indene as shown in the illustration above. In the former case, the diastereomer is called an erythro-isomer and in the latter case the isomer is called a threo-isomer.

In a preferred catalyst of the present invention, $(C_5R_4)$ is preferably a substituted cyclopentadienyl ring in which one R substituent is in the distal position and is at least as bulky at a t-butyl radical and the other R substituents are hydrogen; $(C_5R'_4)$ may comprise hydrocarbyl radicals attached to a single carbon atom in the cyclopentadienyl ring as well as radicals that are bonded to two carbon atoms in the ring to form a fused ring and is preferably an unsubstituted indenyl or fluorenyl radical; Me is preferably a Group IVB metal, such as titanium, zirconium or hafnium, more preferably zirconium or hafnium and most preferably zirconium; Q is preferably a halogen and is most preferably chlorine; p may vary with the valence of the metal atom but is preferably 2; and R" is preferably a bivalent hydrocarbyl radical having one atom covalently bonded to $(C_5R_4)$ and to $(C_5R'_4)$ acting as a bridge between the two cyclopentadienyl rings, e.g., an methylidene radical, substituted or unsubstituted. If substituted, the substituents on the bridge should be such that the bridge preferably has bilateral symmetry, i.e., one side of the bridge is a mirror image of the other. Exemplary hydrocarbyl radicals for the structural bridge include methylidene, isopropylidene, isopentylidene, isoheptylidene, isononylidene and the like in which the substituents on each side of the bridging carbon atom are the same.

The catalyst precursor may be prepared by any method known in the art. Generally, the preparation of the catalyst complex consists of forming and isolating the cyclopentadienyl or substituted cyclopentadienyl ligands which are then reacted with a halogenated metal to form the complex. Synthesis of the catalyst precursor is disclosed in copending U.S. application Ser. No. 08/635,274, filed Apr. 19, 1996 abandoned.

The metallocene catalysts of the present invention are useful in many of the polymerization processes known in the art including many of those disclosed for the preparation of polymers or copolymers of α-olefins. When the catalysts of the present invention are used in the polymerization of ethylene, the processes produce an ethylene/butene copolymer.

Further examples of polymerization processes useful in the practice of the present invention include those disclosed in U.S. Pat. No. 4,767,735 and European Patent Application Publication No. 310,734, the disclosures of which are hereby incorporated herein by reference. These preferred polymerization procedures include the step of prepolymerizing the catalyst and/or precontacting the catalyst with a cocatalyst and an olefin monomer prior to introducing the catalyst into a reaction zone.

The metallocene compound is activated as a catalyst by an ionic ionizing agent or a co-catalyst, such as is an organooxyaluminum compound. The catalyst activator can be an alumoxane or a Lewis acid alone or in combination with aluminum alkyl which will ionize a neutral metallocene compound to form a cationic metallocene catalyst. Examples of such catalyst activators are methyl alumoxane (MAO), tris(pentafluorophenyl)boron or triphenylcarbenium tetrakis(pentafluorophenyl)boronate alone or in combination with triethylaluminum (TEAl). Other catalyst activators are disclosed in U.S. patent application Ser. Nos. 07/419,057 and 07/419,222 both now abandoned and European Patent Publication Nos. 0-277-003 and 0-277-004 which are hereby incorporated by reference.

The catalysts of the present invention are particularly useful in combination with an aluminum cocatalyst, preferably an alumoxane. In addition, a complex may be isolated between a metallocene catalyst as described herein and an aluminum cocatalyst in accordance with the teachings of European Patent Publication Number 226,463 published on Jun. 24, 1987. As disclosed therein, a metallocene is reacted with an excess of alumoxane in the presence of a suitable solvent. A complex of the metallocene and alumoxane may be isolated and used as a catalyst in the present invention.

The alumoxanes useful in combination with the catalysts of the present invention, either in the polymerization reaction or in forming the complex disclosed above, may be represented by the general formula $(R-Al-O-)_n$, in the cyclic form and $R(R-Al-)-)_nALR_2$ in the linear form wherein R is an alkyl group with one to five carbon atoms and n is an integer from 1 to about 20. Most preferably, R is a methyl group and the preferred alumoxane is methylalumoxane (MAO). The alumoxanes can be represented structurally as follows:

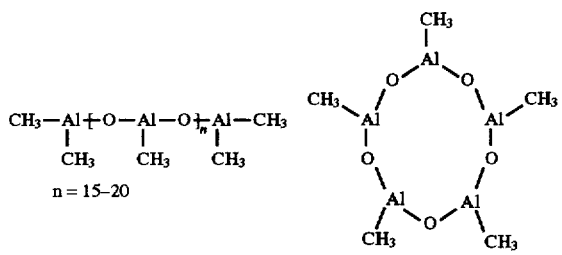

The alumoxanes can be prepared by various methods known in the art. Preferably, they are prepared by contacting water with a solution of trialkyl aluminum, such as, trimethyl aluminum, in a suitable solvent such as a benzene. Another preferred method includes the preparation of alumoxane in the presence of a hydrated copper sulfate as described in the U.S. Pat. No. 4,404,344 the disclosure of which is hereby incorporated by reference. This method comprises treating a dilute solution of trimethyl aluminum in toluene with copper sulfate. The preparation of other aluminum cocatalysts useful in the present invention may be prepared by methods known to those skilled in the art.

The alumoxane cocatalyst may be used alone or with an additional cocatalyst, preferably an aluminumalkylchloride. If an aluminumalkylchloride is used as an additional cocatalyst, it is preferably an aluminumdialkylchloride, such as dimethylaluminum chloride, diethylaluminumchloride, etc., wherein the alkyl has from 1–20 carbon atoms. The aluminumdialkylchloride is most preferably diethylaluminumchloride (DEAC).

The process of the present invention is effective for any known polymerization reaction conditions for olefin oligomerization/(co)polymerization in which metallocene catalysts are used. The copolymerization temperature is preferably from –20° C. to 90° C., most preferably 50° C. to 80° C. The copolymerization pressure is preferably 25 psig to 600 psig, most preferably 100 psig to 500 psig.

The copolymerization process may be either slurry or gas phase. The selection of the particular process will effect the operative and optimum reaction conditions. The preferable process for the present invention is slurry phase.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE 1

A 4-Liter Autoclave reactor was charged with 925 grams hexane and heated to 90° C. A mixture of hydrogen and ethylene at a volume ratio of 0.25 ($H_2/C_2H_4$) was passed through the solvent at 10 ml/min. A catalyst delivery bomb was charged with 2 mg i-Pr(t-BuCp) (Ind)ZrCl$_2$ (isomer mixture) and 2.5 ml 10% MAO solution in toluene. The catalyst bomb was connected to the reactor and the catalyst was charged into the reactor along with 375 g pressurized hexane. The polymerization was allowed to take place at 90° C. for one hour at an agitation rate of 600 rpm. At the end of this period, the monomer supply was stopped, the reactor pressure was released by venting and the polymer slurry was collected in a flask. The solvent was removed under vacuum in a rotary evaporator and dried in a vacuum oven. The polymer yield was 142 g. The results of polymer analysis are given in Table 1.

Molecular weight distribution (MWD) can be represented as the ratio of the weight average molecular weight ($M_w$) to the number average molecular weight ($M_n$): MWD=$M_w/M_n$. This ratio is also known as polydispersity (D).

EXAMPLE 2

The polymerization procedure of Example 1 was repeated with 10 mg of purified i-Pr(t-BuCp) (Ind)ZrCl$_2$ consisting of a single isomer and 2.5 ml MAO solution and the polymerization temperature was maintained at 80° C. The polymerization time was 60 minutes. The process conditions are shown in Table 1. The polymer yield was 210 grams. The results of polymer analysis are given in Table 2.

EXAMPLE 3

The polymerization procedure of Example 1 was repeated with 2.5 mg of purified i-Pr(t-BuCp) (Ind)ZrCl$_2$ consisting of a single isomer and 2.5 ml MAO solution (30% MAO). The polymerization time was 60 minutes. The process conditions are shown in Table 1. At the end of the polymerization period, the reactor vapor phase was collected into an evacuated stainless steel cylinder. The collected vapor was analyzed by modified ASTM-D1946 method using Chandler EGNG (Model AGC 400) by applying refinery gas application method 196A for low $C_{6+}$ hydrocarbons. The polymer yield was 146 grams. The results of polymer analysis are given in Table 2.

EXAMPLE 4

The polymerization procedure of Example 1 was repeated with 2.5 mg of purified i-Pr(t-BuCp) (Ind)$ZrCl_2$ consisting of a single isomer and 2.5 ml MAO solution (30% MAO). The polymerization time was 60 minutes and the polymerization time was 50° C. The process conditions are shown in Table 1. The polymer yield was 53 grams. The results of polymer analysis are given in Table 1.

EXAMPLE 5

The polymerization procedure of Example 1 was repeated with 2.5 mg of purified isopropylidene[3-t-butylcyclopentadienyl-1-(2-methylindenyl)]zirconium dichloride [i-Pr(3-t-BuCp) (2-MeInd)$ZrCl_2$] consisting of a single isomer and 2.5 ml MAO solution (30% MAO). The polymerization time was 60 minutes and the polymerization temperature was 80° C. The process conditions are shown in Table 1. Vapor analysis was done as described in Example 3. The polymer yield was 268 grams. The results of polymer analysis are given in Table 1.

EXAMPLE 6

The polymerization procedure of Example 1 was repeated with 2.5 mg of purified i-Pr(t-BuCp) (2-MeInd)$ZrCl_2$ consisting of a single isomer and 2.5 ml MAO solution (30% MAO). The polymerization time was 60 minutes and the polymerization temperature was 50° C. The process conditions are shown in Table 1. The polymer yield was 173 grams. The results of polymer analysis are given in Table 1.

EXAMPLE 7

The polymerization procedure of Example 1 was repeated with 2.5 mg of purified i-Pr(t-BuCp) (2-MeInd)$ZrCl_2$ consisting of a single isomer and 2.5 ml MAO solution (30% MAO) and 0.91 ml of a 0.25M solution of diethylaluminum chloride (DEAC) in hexane as a second cocatalyst. The polymerization time was 60 minutes and the polymerization temperature was 80° C. The process conditions are shown in Table 1. Vapor phase analysis was done as described in Example 3. The polymer yield was 287 grams. The results of polymer analysis are given in Table 1.

EXAMPLE 8

The polymerization procedure of Example 1 was repeated with 2.5 mg of purified i-Pr(t-BuCp)(2-MeInd)$ZrCl_2$ consisting of a single isomer and 2.5 ml MAO solution (30% MAO) and 0.91 ml of a 0.25M solution of diethylaluminum chloride (DEAC) in hexane as a second cocatalyst. The polymerization time was 60 minutes and the polymerization temperature was 80° C. The reactor pressure was maintained at 62 psig. The process conditions are shown in Table 1. The polymer yield was 132 grams. The results of polymer analysis are given in Table 1.

EXAMPLE 9

The polymerization procedure of Example 1 was repeated with 2.5 mg of phenylmethylsilylidene[3-t-butylcyclopentadienyl-1-indenyl]zirconium dichloride [Ph(Me)Si(t-BuCp)(Ind)$ZrCl_2$] and 2.5 ml MAO solution (10% MAO). The polymerization time was 60 minutes and the polymerization temperature was 80° C. The process conditions are shown in Table 1. The polymer yield was 50 grams. The results of polymer analysis are given in Table 1.

EXAMPLE 10

The polymerization procedure of Example 9 was repeated with the reactor pressure at 62 psig. The process conditions are shown in Table 1. Vapor phase analysis was done as described in Example 3. The polymer yield was 41 grams. The results of polymer analysis are given in Table 1.

EXAMPLE 11

The polymerization procedure of Example 11 was repeated with 2.5 mg of phenylmethylmethylidene[3-t-butylcyclopentadienyl-1-fluorenyl]zirconium dichloride [Ph(Me)C(3-t-BuCp)(Flu)$ZrCl_2$] and 2.5 ml MAO solution (10% MAO). The polymerization time was 60 minutes and the polymerization temperature was 80° C. The process conditions are shown in Table 1. The polymer yield was 173 grams. The results of polymer analysis are given in Table 1.

EXAMPLE 12

The polymerization procedure of Example 11 was repeated with dimethylsilylidene[3-t-butylcyclopentadienyl-1-fluorenyl]zirconium dichloride [(Me)$_2$Si (3-t-BuCp) (Flu) $ZrCl_2$]. The process conditions are shown in Table 1. The polymer yield was 11 grams. The results of polymer analysis are given in Table 1. Vapor phase analysis was done as described in Example 3.

TABLE 1

| Example | Metallocene | Metallocene, mmol | Temp., C. | Cocatalyst 1 | Cocatalyst 2 | Reactor Pressure |
|---|---|---|---|---|---|---|
| 1 | iPr(3-t-BuCp)(Ind)ZrCl$_2$(isomer mixture) | 0.0046 mmol | 90 | | 7.8 mmol Al | 125 psi |
| 2 | iPr(3-t-BuCp)(Ind)ZrCl$_2$(Single Isomer) | 0.0229 mmol | 80 | | 7.8 mmol Al | 125 psi |
| 3 | iPr(3-t-BuCp)(Ind)ZrCl$_2$(Single Isomer) | 0.0057 mmol | 80 | | 11 mmol Al | 125 psi |
| 4 | iPr(3-t-BuCp)(Ind)ZrCl$_2$(Single Isomer) | 0.0057 mmol | 50 | | 11 mmol Al | 125 psi |
| 5 | iPr(3-t-BuCp)(2-MeInd))ZrCl$_2$(Single Isomer) | 0.0057 mmol | 80 | | 11 mmol Al | 125 psi |
| 6 | iPr(3-t-BuCp)(2-MeInd)ZrCl$_2$(Single Isomer) | 0.0057 mmol | 50 | | 11 mmol Al | 125 psi |
| 7 | iPr(3-t-BuCp)(2-MeInd)ZrCl$_2$(Single Isomer) | 0.0057 mmol | 80 | 0.23 mmol DEAC | 11 mmol Al | 125 psi |
| 8 | iPr(3-t-BuCp)(2-MeInd)ZrCl$_2$(Single Isomer) | 0.0057 mmol | 80 | 0.23 mmol DEAC | 11 mmol Al | 62.5 psi |
| 9 | Ph(Me)Si(3-t-BuCp)(Ind)ZrCl$_2$(Isomer Mixture) | 0.0057 mmol | 80 | | 7.8 mmol Al | 125 psi |
| 10 | Ph(Me)Si(3-tBuCp)(Ind)ZrCl$_2$(Isomer Mixture) | 0.0057 mmol | 80 | | 7.8 mmol Al | 62 psi |

TABLE 1-continued

| Example | Metallocene | Metallocene, mmol | Temp., C. | Cocatalyst 1 | Cocatalyst 2 | Reactor Pressure |
|---|---|---|---|---|---|---|
| 11 | Ph(Me)C(3-t-BuCp)(Flu)ZrCl$_2$ | 0.0057 mmol | 80 | | 7.8 mmol Al | 125 psi |
| 12 | (Me)$_2$Si(3-t-BuCp)(Flu)ZrCl$_2$ | 0.0057 mmol | 80 | | 7.8 mmol Al | 125 psi |

DEAC—diethylaluminum chloride
NA = Not Analyzed

TABLE 2

| Example | Yield, g | Activity, g/mol Zr | Mw | Mn | MWD | % Wax | Tm in C | dH in J/g | Reactor vapor Analysis | wt % C4 | Mole % C4 |
|---|---|---|---|---|---|---|---|---|---|---|---|
| 1 | 142 | 30900000 | 39675 | 9623 | 4.1 | 13.1 | NA | NA | NA | 0.5 | 0.24 |
| 2 | 210 | 9200000 | 2711 | 1827 | 1.5 | 69 | NA | NA | NA | 0.97 | 0.49 |
| 3 | 146 | 25600000 | 3835 | 2164 | 1.8 | 70 | 123.2; 109.6 | 219 | Butane detected | 0.46 | 0.23 |
| 4 | 58 | 10200000 | 4996 | 2503 | 2 | 62 | 126.4; 111.2 | 228.4 | NA | 0.77 | 0.39 |
| 5 | 268 | 47017000 | 3462 | 1982 | 1.7 | 67 | 122.2 | 210.7 | Butane detected | 0 | 0 |
| 6 | 173 | 30350877.19 | 3711 | 2188 | 1.7 | 64 | 124.8; 113.3 | 239.2 | NA | 0 | 0 |
| 7 | 287 | 50350877.19 | 3892 | 2312 | 1.7 | 37 | 123.8; 110.4 | 229.2 | Butane detected | 0 | 0 |
| 8 | 132 | 23157894.74 | 9567 | 4426 | 2.2 | 14 | 128.6 | 231.1 | NA | 0 | 0 |
| 9 | 50 | 8771929.825 | 10134 | 26248 | 2.6 | NA | 126; 108.5 | 228.4 | NA | 0 | 0 |
| 10 | 41 | 7192982.456 | 9202 | 1970 | 4.7 | NA | 124.7; 119.60 | 225.9 | Traces of butane and ethane | 0 | 0 |
| 11 | 173 | 30350877.19 | 26248 | 10134 | 2.6 | NA | 133.2 | 238.3 | NA | 0 | 0 |
| 12 | 11 | 1929824.561 | 6701 | 1996 | 3.4 | NA | 124.8 | 211.3 | Butane and ethane detected | 0 | 0 |

NOTES:
1. Percent butane incorporated in the polymer was estimated by $^{13}$C NMR.
2. Thermal properties were measured by Differential Scanning Calorimetry (DSC).
3. Molecular weights were determined by Gel Permeation Chromatography (GPC).
4. Percent wax was determined by extracting 7.5 g polymer with 80 mL cyclohexane under refluxing conditions at 180#C for one hour and 10 minutes using cyclohexane Soxhlet extraction apparatus bearing tradename Soctec. The percent loss in weight of the polymer was taken at the "% wax". The procedure was repeated in triplicate for each sample and the average value was reported.

It has been found that a single metallocene catalyst can be used to simultaneously dimerize ethylene to butene and polymerize ethylene and butene from said dimerization to produce ethylene/butene copolymer. Consequently, a single metallocene catalyst in a single reactor with a single monomer can produce a copolymer of two different a-olefins.

Regarding the relationship between stereochemistry of the complexes and the polymer product, the i-Pr(3-t-BuCp)(Ind)ZrCl$_2$ exists as two stereoisomers, namely threo- and erythro- isomers, depending upon the spatial position of t-butyl groups with respect the phenyl ring of the indenyl group. Purification methods allowed isolation of one isomer, presumably the threo- isomer, which polymerized propylene to give isotactic polypropylene. An example of such a purification method is disclosed in copending patent applications U.S. Ser. No. 08/635,274 and U.S. Serial No. [Attorney Docket No. DC1004/1005], hereby incorporated by reference. The effect of producing a copolymer with a single metallocene catalyst and a single monomer was present whether a single isomer or mixture of the two isomers was used in the metallocene catalyst (Examples 1–4).

Even though, only one metallocene was found to be effective in dimerization of ethylene followed by polymerization to give ethylene/butene copolymers, under conditions employed in the working examples, it should be noted that other metallocenes listed here dimerize ethylene, followed presumably, by hydrogenation to give butane. The inventors believe that the hydrogenation of butene to butane by the metallocenes is due to the presence of hydrogen in the reactor. The inventors also believe that if hydrogen is omitted in the polymerization, the metallocenes used in Examples 5, 7, 10 and 12 and the examples in which the reactor gases were not analyzed for butane will also yield ethylene/butene copolymers. Many metallocenes are known to be effective catalysts for hydrogenation of 1-olefins when used in the presence of hydrogen. Thus, for example, copending patent application U.S. Ser. No. 08/474,883 shows that titanocene dichloride effectively catalyzes hydrogenation of propylene to propane in the presence of hydrogen. The inventors believe that the primary feature in these bridged metallocenes which is responsible for dimerization of ethylene and the simultaneous polymerization of ethylene and the dimerization product (butene) to give ethylene/butene copolymers is the presence of a group stereochemically equal to or larger in size than a t-butyl group on the distal carbon of the cyclopentadienyl ring.

The following examples illustrate the propositions stated above:

EXAMPLE 101

A 4-Liter Autoclave reactor is charged with 925 grams hexane and heated to 80° C. Ethylene is passed through the solvent at 8 ml/min. No hydrogen is fed into the reactor. A catalyst delivery bomb is charged with 2 mg isopropylidene [3-t-butylcyclopentadienyl-1-indenyl]zirconium dichloride [i-Pr(3-t-BuCp)(2-Me-Ind)ZrCl$_2$] (isomer mixture) and 2.5 ml 10%MAO solution in toluene. The catalyst bomb is connected to the reactor and the catalyst is charged into the reactor along with 375 g pressurized hexane. The polymerization is allowed to take place at 80° C. for one hour at an agitation rate of 600 rpm. At the end of this period, the monomer supply is stopped, the reactor pressure is released by venting and the polymer slurry is collected in a flask. The solvent is removed under vacuum in a rotary evaporator and dried in a vacuum oven. The resulting polymer is an ethylene/butene copolymer.

EXAMPLE 102

The polymerization procedure of Example 1 is repeated with 10 mg of purified i-Pr(3-t-BuCp) (2-Me-Ind)ZrCl$_2$ consisting of a single isomer. The resulting polymer is an ethylene/butene copolymer.

EXAMPLE 103

The polymerization procedure of Example 1 is repeated with 10 mg of purified Ph(Me)Si(3-t-BuCp)(Ind)ZrCl$_2$ consisting of an isomer mixture. The resulting polymer is an ethylene/butene copolymer.

EXAMPLE 104

The polymerization procedure of Example 1 is repeated with 10 mg of purified Ph(Me)Si(3-t-BuCp) (Ind)ZrCl$_2$ consisting of a single isomer. The resulting polymer is an ethylene/butene copolymer.

EXAMPLE 105

The polymerization procedure of Example 1 is repeated with 10 mg of purified Ph(Me)C(3-t-BuCp) (Flu)ZrCl$_2$ consisting of an isomer mixture. The resulting polymer is an ethylene/butene copolymer.

EXAMPLE 106

The polymerization procedure of Example 1 is repeated with 10 mg of purified Ph(Me)C(3-t-BuCp) (Ind)ZrCl$_2$ consisting of a single isomer. The resulting polymer is an ethylene/butene copolymer.

EXAMPLE 107

The polymerization procedure of Example 1 is repeated with 10 mg of purified (Me)$_2$Si(3-t-BuCp) (Flu)ZrCl$_2$ consisting of an isomer mixture. The resulting polymer is an ethylene/butene copolymer.

EXAMPLE 108

The polymerization procedure of Example 1 is repeated with 10 mg of purified (Me)$_2$Si(3-t-BuCp) (Flu)ZrCl$_2$ consisting of a single isomer. The resulting polymer is an ethylene/butene copolymer.

A catalyst which is effective in the present invention is apparently a metallocene catalyst having two cyclopentadienyl rings connected by a hydrocarbonyl bridge, one cyclopentadienyl ring being substituted with a substituent being at least as bulky as a t-butyl and the other cyclopentadienyl ring being indenyl or fluorenyl, substituted or unsubstituted. The hydrocarbyl bridge preferably has bilateral symmetry and is a bivalent single carbon radical, i.e., a methylidene radical, which can be substituted as long as bilateral symmetry is present, i.e., the substituents are the same. The preferred ligand structure is an isopropylidene[3-t-butylcyclopentadienyl-1-indenyl] radical. The preferred metallocene compound is isopropylidene[3-t-butyl cyclopentadienyl-1-indenyl]zirconium dichloride.

Obviously, numerous modifications and variations of the present invention are possible in light of the above teachings. It is to be understood that the invention may be practiced otherwise than as specifically described above within the scope of the appended claims.

What is claimed as new and desired to be secured by Letter of Patent of the United States of America is:

1. A process for polymerizing an olefin monomer to form a copolymer comprising:

a) preparing a single metallocene catalyst comprising:

1) a metallocene compound described by the formula

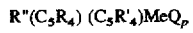

wherein (C$_5$R$_4$) is a substituted cyclopentadienyl ring; (C$_5$R'$_4$) is an indenyl or fluorenyl ring, substituted or unsubstituted; each R and R' is hydrogen or hydrocarbyl radical having from 1–20 carbon atoms, a halogen, an alkoxy, and alkoxy alkyl or an alkylamino radical, each R and R' may be the same or different; (C$_5$R$_4$) has one R substituent in a distal position which is at least as bulky as a t-butyl radical; R" is a structural bridge between the (C$_5$R$_4$) and (C$_5$R'$_4$) rings to impart stereorigidity; Q is a hydrocarbyl radical having 1–20 carbon atoms or is a halogen; Me is a Group IIIB, IVB, VB, or VIB metal as positioned in the Periodic Table of Elements; and p is the valence of Me minus 2;

2) an ionizing agent;

b) introducing the catalyst into a polymerization reaction zone containing a single monomer consisting of ethylene;

c) maintaining the reaction zone under copolymerization reaction conditions; and d) extracting an ethylene copolymer.

2. The process of claim 1 wherein (C$_5$R$_4$) is a substituted cyclopentadienyl radical with one R substituent in a distal position which is a t-butyl radical.

3. The process of claim 1 wherein (C$_5$R'$_4$) is an unsubstituted indenyl.

4. The process of claim 1 wherein (C$_5$R'$_4$) is a substituted indenyl.

5. The process of claim 4 wherein (C$_5$R'$_4$) is 2-methylindenyl.

6. The process of claim 1 wherein (C$_5$R'$_4$) is an unsubstituted fluorenyl ring.

7. The process of claim 1 wherein (C$_5$R'$_4$) is an substituted fluorenyl ring.

8. The process of claim 1 wherein Me is titanium, zirconium or hafnium.

9. The process of claim 1 wherein R" is a hydrocarbyl radical.

10. The process of claim 9 wherein R" has bilateral symmetry.

11. The process of claim 1 wherein R" is isopropylidene, phenylmethylsilylidene, phenylmethylmethylidene or dimethylsilylidene.

12. The process of claim 1 wherein R" is isopropylidene.

13. The process of claim 1 wherein R"(C$_5$R$_4$) (C$_5$R'$_4$) is an isopropylidene[3-t-butylcyclopentadienyl-1-indenyl] radical.

14. The process of claim 1 wherein R" (C$_5$R$_4$) (C$_5$R'$_4$) is an isopropylidene[3-t-butylcyclopentadienyl-1-(2-methylindenyl)] radical.

15. The process of claim 1 wherein R"(C$_5$R$_4$) (C$_5$R'$_4$) is an phenylmethylsilylidene[3-t-butylcyclopentadienyl-1-indenyl] radical.

16. The process of claim 1 wherein R"(C$_5$R$_4$) (C$_5$R'$_4$) is an phenylmethylmethylidene[3-t-butylcyclopentadienyl-1-fluorenyl]radical.

17. The process of claim 1 wherein R"(C$_5$R$_4$) (C$_5$R'$_4$) is an phenylmethylsilylidene[3-t-butylcyclopentadienyl-1-fluorenyl] radical.

13

18. The process of claim 1 wherein the metallocene is a single isomer.

19. The process of claim 1 wherein the metallocene is an isomer mixture.

20. The process of claim 1 wherein the ionizing agent is an alumoxane.

21. The process of claim 1 wherein the ionizing agent is a combination of an alumoxane and an aluminumalkylchloride.

22. The process of claim 21 wherein the aluminumalkylchloride is an aluminumdialkylchloride.

23. The process of claim 22 wherein the aluminumalkylchloride is diethylaluminumchloride.

24. The process of claim 1 further comprising prepolymerizing the catalyst prior to introducing it into the reaction zone, said step of prepolymerizing including contacting the catalyst with an olefin monomer and an alumoxane.

25. The process of claim 1 wherein $R''(C_5R_4)(C_5R'_4)MeQ_p$ is isopropylidene[3-t-butylcyclopentadienyl-1-indenyl]zirconium dichloride.

26. The process of claim 1 wherein $R''(C_5R_4)(C_5R'_4)MeQ_p$ is isopropylidene[3-t-butylcyclopentadienyl-1-(2-methylindenyl)]zirconium dichloride.

27. The process of claim 1 wherein $R''(C_5R_4)(C_5R'_4)MeQ_p$ is phenylmethylsilylidene[3-t-butylcyclopentadienyl-1-indenyl]zirconium dichloride.

14

28. The process of claim 1 wherein $R''(C_5R_4)(C_5R'_4)MeQ_p$ is phenylmethylmethylidene[3-t-butylcyclopentadienyl-1-fluorenyl]zirconium dichloride.

29. The process of claim 1 wherein $R''(C_5R_4)(C_5R'_4)MeQ_p$ is dimethylsilylidene[3-t-butylcyclopentadienyl-1-fluorenyl]zirconium dichloride.

30. The process of claim 1 wherein the temperature is from −20° C. to 90° C.

31. The process of claim 1 wherein the temperature is from 50° C. to 80° C.

32. The process of claim 1 wherein the pressure 25 psig to 600 psig.

33. The process of claim 1 wherein the pressure is from 100 psig to 500 psig.

34. The process of claim 1 wherein the process is either slurry or gas phase.

35. The process of claim 1 wherein the process is slurry.

36. The process of claim 1 wherein the process is gas phase.

37. The process of claim 1 wherein the process is carried out in the absence of hydrogen.

38. The process of claim 25 wherein the process is carried out in the presence of hydrogen.

* * * * *